3,553,604
**THERMALLY STABLE APPARATUS FOR
LASER DEVICE**
Bernhard Andress, Hubert Köhler, and Fritz Schmidt,
Erlangen, Germany, assignors to Siemens Aktiengesellschaft, a corporation of Germany
Filed Aug. 14, 1968, Ser. No. 752,708
Claims priority, application Germany, Aug. 19, 1967,
1,614,585
Int. Cl. H01s 3/02
U.S. Cl. 331—94.5                                10 Claims

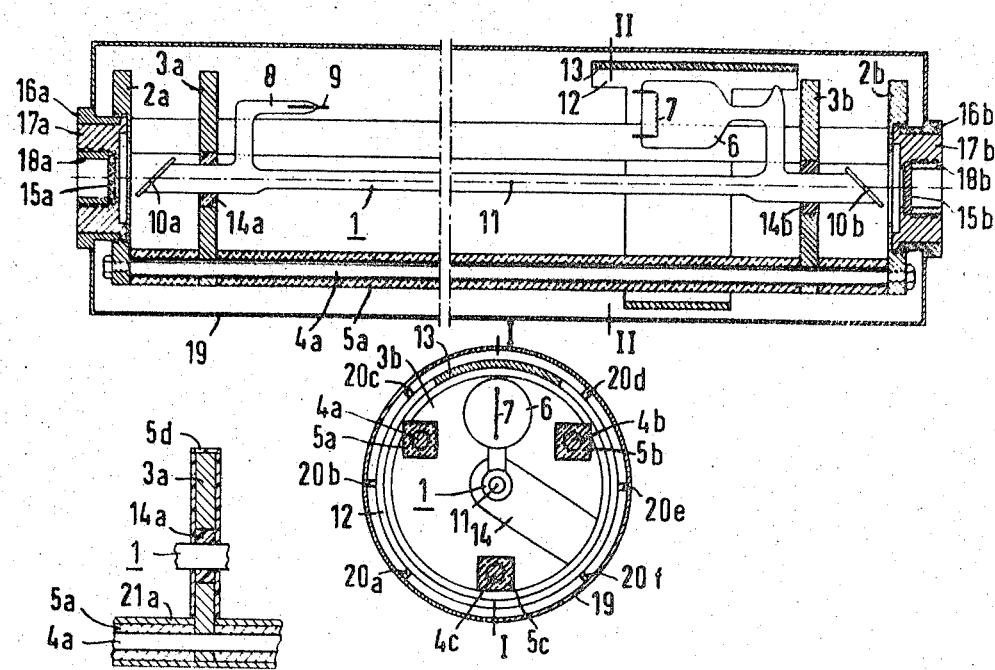

ABSTRACT OF THE DISCLOSURE

Heat insulating material is utilized to cover at least part of the holding structure of good heat conductivity which spports a laser device in a housing of good heat conductivity. An annular diaphragm around part of the laser device directs heat produced in the laser device to the housing in at least approximately isotropic rotational symmetry relative to the laser axis.

DESCRIPTION OF THE INVENTION

The present invention relates to thermally stable apparatus for a laser device. More particularly, the invention relates to thermally stable apparatus for a laser device supported in a housing of good heat conductivity by a holding structure of good heat conductivity.

Laser beams may be utilized as pilot beams for the transmission of information and may be utized for the solution of control problems, among other uses. Considerable demands are made upon the mechanical supporting structure of the laser device in order to ensure that the direction of the laser beam remains constant. Irregularity in heating may be caused, for example, in a gas laser by cathode heating of the gas discharge or by the gas discharge itself, or other components of the laser device. Such irregularity causes irregular expansion of the holding structure of the laser device and such irregular expansion in turn causes a deviation of the laser beam from the desired predetermined or datum direction. The deviation of the laser beam from its desired direction may be further increased by the requirement that the laser housing be completely dust tight and air tight. This requirement is effective in flame-proof apparatus especially utilized in mining operations. The housing of the flame-proof apparatus may become distorted due to irregular heating and may deflect the laser beam from its desired direction.

A thermally stable apparatus for supporting a laser device may be provided by utilizing Invar steel rods in the holding structure or by utilizing rods of a similar material having a low thermal coefficient of expansion. This structure, however, does not prevent deviation of the laser beam from a desired direction. A gas laser device supported by an Invar steel holding structure, for example, shows a deviation of approximately 8 centimeters at a distance of 200 meters. The holding rods of the holding structure may also be made of material having good thermal conductivity such as, for example, aluminum.

The holding rods of the holding structure of the laser device are preferably designated so that they may expand in the direction of the laser beam, when the temperature increases, but that no cross-components occur which may cause a deflection of said laser beam. Such a design, however, has the disadvantage that in order to avoid cross-components, the holding rods must be exactly reproduced in configuration and must also be uniformly heated. For this reason, commercially sold apparatus is wrapped in a protective sheet of material of good thermal conductivity. A "swimming suspension" thereby ensures that no forces are transmitted to the holding structure when the protective sheet of material is heated. The air between the protective sheet of material and the holding structure is assumed to be stagnant because of its poor thermal conductivity, so that the holding structure is subjected to a uniform temperature. The disadvantage of this arrangement is that the cost is high and that the intermediate layer of insulating air is effective only to a limited extent. This is especially pronounced when the apparatus is positioned vertically relative to a normal horizontal position.

The principal object of the present invention is to provide new and improved thermally stable apparatus for a laser device.

An object of the present invention is to provide thermally stable apparatus for a laser device which prevents deviation of the laser beam from a desired direction.

An object of the present invention is to provide thermally stable apparatus for a laser device which overcomes the disadvantages of known supporting structures for laser devices.

An object of the present invention is to provide thermally stable apparatus for a laser device, which apparatus is simple in structure and inexpensive to manufacture.

An object of the present invention is to provide thermally stable apparatus for a laser device which provides thermal stability and thereby prevents deviation of the laser beam from a desired direction.

An object of the present invention is to provide thermally stable apparatus for a laser device in which the position of the laser device does not adversely affect the thermal stability.

An object of the present invention is to provide thermally stable apparatus for a laser device which is efficient, effective and reliable in operation.

In accordance with the present invention, thermally stable apparatus for a laser device supported in a housing of good heat conductivity by a holding structure of good heat conductivity, comprises heat insulating material covering at least part of the holding structure. The laser device produces a laser beam along a laser axis. An annular diaphragm around part of the laser device directs heat produced in the laser device to the housing in at least approximately isotropic rotational symmetry relative to the laser axis.

The holding structure comprises at least a pair of spaced carrier plates substantially perpendicular to the laser axis and coupled to each other by a plurality of holding rods substantially parallel to the laser axis. The thermally stable apparatus comprises heat insulating material covering at least the holding rods.

The laser device includes a source of heat rotationally asymmetrical relative to the laser axis. The holding structure is at least approximately in rotational symmetry relative to the laser axis and includes an annular diaphragm of good heat conductivity around the source of heat and at least approximately in rotational symmetry relative to the laser axis. The annular diaphragm includes laterally extending portions in the vicinity of the source of heat. Heat conducting means couples at least part of the annular diaphragm at its outer periphery with the housing. The heat conducting means may comprise part of the housing. The housing is at least rotationally symmetrical relative to the laser axis. The heat insulating material comprises a synthetic material foam which may comprise Urethan foam. A metal cover may be provided on at least part of the heat insulating material.

Covering part of the holding structure with heat insulating material maintains the temperature of the holding structure constant in the direction of the laser axis and prevents a temperature gradient perpendicular to the laser axis from occurring in a surface of the holding structure. The heat insulating material cover also prevents the holding structure from absorbing heat, so that it prevents the occurrence of a difference in expansion of different parts of said holding structure thereby preventing lateral displacement and maladjustment of the laser device. Deviation of the laser beam is thereby prevented. Furthermore, the rotational asymmetrical isotropic flow of heat toward the housing prevents the housing from being heated irregularly and thereby prevents lateral distortion or maladjustment of said housing. This has particular application with reference to the resonator reflector and optical components of the laser device. The flow of heat in a rotationally symmetrical isotropic pattern to the housing also prevents irregular peripheral heating of said housing thereby eliminating another possible cause of lateral displacement. A laser device supported by the thermally stable apparatus of the present invention may thus be positioned in a sealed housing without causing deviation of the laser beam from a desired direction.

In order that the present invention may be readily carried into effect, it will now be described with reference to the accompanying drawing, wherein:

FIG. 1 is a sectional view, taken along the lines I—I of FIG. 2, of an embodiment of a laser device supported by an embodiment of the thermally stable apparatus of the present invention;

FIG. 2 is a sectional view, taken along the lines II—II of FIG. 1, of the embodiment of the laser device and the thermally stable apparatus of FIG. 1; and FIG. 3 is a sectional view of part of the thermally stable apparatus of FIGS. 1 and 2, illustrating a modification thereof.

In the figures, the same components are identified by the same reference numerals.

FIG. 1 is a longitudinal sectional view of a gas laser device. A capillary tube 1 is filled with a helium-neon gas mixture and is sealed at each end by a Brewster window 10a and 10b, respectively. The capillary tube 1 is supported in a housing 19 by a holding structure which comprises two carrier plates 3a and 3b. The carrier plates 3a and 3b are positioned perpendicularly to the laser axis 11 of the laser device along which the laser beam is directed.

Elastic material 14a and 14b is provided at the central area of each of the carrier plates 3a and 3b, respectively, and surrounds the capillary tube 1 in order to prevent damage to said capillary tube. Two additional carrier plates 2a and 2b may be provided in the housing 19 and the carrier plates 2a, 2b, 3a and 3b are coupled to each other by a plurality of holding rods 4a, 4b and 4c, of which only the holding rod 4a is shown in FIG. 1. The additional carrier plates 2a and 2b are provided in the areas of the resonators 15a and 15b, respectively.

The holding rods 4a, 4b and 4c (FIG. 2) and the carrier plates 2a, 2b, 3a and 3b must comprise material of good heat conductivity. The holding rods and carrier plates may thus be made of aluminum, for example. In accordance with the present invention, the holding rods 4a, 4b and 4c are each covered with heat insulating material 5a, 5b and 5c, respectively, as shown in FIG. 2. The heat insulating material comprises a synthetic material foam such as, for example, Urethan foam or Styropor foam. Urethan foam is particularly suitable, since its pores are not filled with air, but with monofluorictrichloromethane which has a heat transfer coefficient considerably lower than that of air.

The covering or wrapping of the holding rods 4a, 4b and 4c with heat insulating material 5a, 5b and 5c, respectively, largely prevents direct heat flow from the capillary tube 1 to said holding rods. The heat insulating material cover also prevents a temperature gradient from occurring between the different holding rods 4a, 4b, 4c. In a stable condition, the holding rods 4a, 4b and 4c are at a temperature which is essentially determined by the temperature of the carrier plates 2a, 2b, 3a and 3b. If the carrier plates at the different ends of the capillary tube 1 are at different temperatures, only one temperature gradient would be produced along the holding rods 4a, 4b and 4c. The holding rods would thus expand uniformly during heating of the laser device and maladjustment of the carrier plates would be prevented.

As shown in FIG. 3, for the carrier plate 3a, each of the carrier plates 2a, 2b, 3a and 3b may be covered by a layer of heat insulating material 5b. When the adjustment of the laser beam must be extremely accurate, the covering of the carrier plates with heat insulating material prevents the occurrence of a temperature gradient along the surfaces of the carrier plates resulting from irregularity of heating of said carrier plates. The carrier plates are then essentially heat sources having exactly constant temperatures since the heat insulating material 5b, for example, stabilizes their condition. This also eliminates irregular heating of the holding rods.

A resonator reflector 15a is threadedly coupled with the carrier plate 2a and a resonator reflector 15b is threadedly coupled with the carrier plate 2b. An additional holding component 16a and 17a may be utilized to secure the resonator reflector 15a to the plate 2a and an additional component 16b and 17b may be utilized to secure the resonator reflector 15b to the plate 2b. The position of the resonator reflector 15a is adjustable with the aid of a threadedly coupled annular member 18a and the position of the resonator reflector 15b is adjustable with the aid of a threadedly coupled annular member 18b. The adjustment of the resonator reflectors 15a and 15b remains unchanged, since there is no maladjustment of the carrier plates 2a and 2b as a result of the thermally stable apparatus of the present invention. The optical system of the laser device is not shown in the figures, in order to maintain the clarity of illustration. Such optical system functions to magnify the diameter of the laser beam and would be adjustably mounted on the additional holding components 16a, 16b and 17a, 17b.

The capillary tube 1 has laterally extending portions, projections or extensions 6 and 8 in the direction of the laser axis 11. An anode 9 for gas discharge is provided in the extending portion 8. A cathode 7 is provided for gas discharge in the extending portion 6. The heat produced in the laser device is produced primarily by the cathode 7. The heat source, which is the cathode 7, is asymmetrical with the laser axis 11, so that the heat flowing therefrom is anisotropic in rotational symmetry relative to said laser axis.

The projection 6 of the capillary tube 1 is surrounded by an annular diaphragm 12 which is coaxially positioned around the laser axis 11 and which has laterally extending portions in the vicinity of the source of heat or cathode 7 and terminates in a shielding diaphragm 13. The annular diaphragm 12 comprises material of good heat conductivity such as, for example, aluminum, and is at least approximately in rotational symmetry relative to the laser axis 11.

The shielding diaphragm 13 prevents a direct flow of heat from the cathode 7 to the housing 19. Instead, heat reflected by the shielding diaphragm 13 is distributed with at least approximate uniformity over the entire annular diaphragm 12 which transfers such heat to the housing 19. The annular diaphragm 12 thus transfers heat produced by the cathode 7 to the housing 19 in isotropic rotational symmetry or isotropically in rotational symmetry relative to the laser axis 11. This prevents irregular heating of the housing 19 along its periphery and thereby prevents displacement of the housing 19 or maladjustment thereof. Due to the rotational symmetrical isotropic flow of heat to the housing 19, said housing may be sealed and the laser device may be installed and operated in any desired position such as, for example, a vertical position.

As shown in FIG. 2, the holding rods 4a, 4b and 4c are positioned in rotational symmetry relative to the laser axis 11. As shown in FIG. 2, the annular diaphragm 12 is coupled to the housing 19 at the outer periphery of said diaphragm and the inner periphery of said housing by a plurality of members or connectors 20a, 20b, 20c, 20d, 20e and 20f comprising materials of good thermal conductivity. The connectors 20a to 20f may be integrally formed with, and thereby comprise part of, the housing 19. The connectors 20a to 20f ensure a good flow of heat to the housing.

The heat insulating material 5a, 5b, 5c, 5d, and so on may be provided by a spraying operation. It may also be provided in the form of prefabricated cylindrical covers or tubes, as shown in the figure, which may be fitted on the corresponding holding rods, or it may be formed as sheets which may be fitted on the corresponding plates. The heat insulating material 5a, 5b and 5c need not necessarily be of annular cross section, but may have any suitable geometric configurational cross section, as shown in FIG. 2, wherein such material is of substantially square cross section.

In the modification of FIG. 3, the heat insulating material 5a is covered with a layer 21a of metal. Each of the heat insulating material 5a, 5b and 5c is similarly covered with a layer of metal in the modification of FIG. 3. The metal layer 21a of FIG. 3 reflects heat radiated toward the holding rod 4a and thereby reduces the heat adsorption of said holding rod.

If operational safety permits, only the Brewster windows 10a and 10b and the resonator reflectors 15a and 15b are tightly sealed and the remainder of the housing 19 need not be so sealed. The holding rods 4a, 4b and 4c may comprise Invar steel in order to improve the accuracy of direction of the laser beam. The advantages provided by the apparatus of the present invention, however, do not depend upon the use of special material, but rather upon the specific heat insulating material and annular diaphragm described herein. In accordance with the present invention, the holding rods of equipment already being utilized may be covered with heat insulating material to provide accuracy of direction of the laser beam.

As hereinbefore mentioned, the gas laser device having holding rods of Invar steel and supported by a known holding structure in a sealed housing produces a laser beam which deviates from the laser axis or desired direction by approximately 8 centimeters at a distance of 200 meters. If the holding rods of the holding structure which supports the laser device are covered with Styropor heat insulating material, the laser beam deviates approximately 3 millimeters at 200 meters. This deviation approaches the reference limit caused by air turbulence. The temperature of the holding rods, after insulation with Styropor, was approximately 50° C.

While the invention has been described by means of specific examples and in specific embodiments, we do not wish to be limited thereto, for obvious modifications will occur to those skilled in the art without departing from the spirit and scope of the invention.

We claim:

1. Thermally stable apparatus for a laser having a laser axis and having resonator reflectors along said axis supported in a housing of good heat conductivity by a holding structure of good heat conductivity, said laser having a cathode and an anode for generating a gas discharge therebetween, said holding structure including holding rods which hold said reflectors in place, said thermally stable apparatus comprising heat insulating material covering said holding rods, and an annular heat conducting member around said cathode for directing heat produced in said cathode to said housing in rotational symmetry relative to said laser axis.

2. Thermally stable apparatus as claimed in claim 1, wherein said holding structure comprises at least a pair of spaced carrier plates substantially perpendicular to said laser axis and coupled to each other by said holding rods which are substantially parallel to said laser axis.

3. Thermally stable apparatus as claimed in claim 1, wherein said holding rods are equally spaced from said axis.

4. Thermally stable apparatus as claimed in claim 3, wherein said annular heat conducting member extends in said axial direction in the vicinity of said cathode.

5. Thermally stable apparatus as claimed in claim 3, further comprising heat conducting means coupling at least part of said annular heat conducting member at its outer periphery with said housing.

6. Thermally stable apparatus as claimed in claim 5, wherein said heat conducting means comprises part of said housing.

7. Thermally stable apparatus as claimed in claim 1, wherein said housing is rotationally symmetrical relative to said laser axis.

8. Thermally stable apparatus as claimed in claim 1, wherein said heat insulating material comprises a synthetic material foam.

9. Thermally stable apparatus as claimed in claim 1, wherein said heat insulating material comprises Urethan foam.

10. Thermally stable apparatus as claimed in claim 1, further comprising a metal cover on at least part of said heat insulating material.

References Cited

UNITED STATES PATENTS

| | | |
|---|---|---|
| 1,630,056 | 5/1927 | Buttolph. |
| 2,238,277 | 4/1941 | Miller. |
| 2,433,809 | 12/1947 | Clapp. |
| 2,904,710 | 9/1959 | Beeninga et al. |
| 3,390,297 | 6/1968 | Vollmer. |
| 3,440,563 | 4/1969 | Clement. |

FOREIGN PATENTS

| | | |
|---|---|---|
| 1,147,270 | 4/1969 | Great Britain. |

OTHER REFERENCES

Huchital et al.: IEEE Jour. of Quant. Elect., vol. QE–3, September 1967, pp. 378–9.

RONALD L. WIBERT, Primary Examiner

E. S. BAUER, Assistant Examiner